UNITED STATES PATENT OFFICE.

JOHN A. STRANSKY, OF PUKWANA, SOUTH DAKOTA.

SMOKELESS POWDER.

SPECIFICATION forming part of Letters Patent No. 656,678, dated August 28, 1900.

Application filed February 27, 1900. Serial No. 6,743. (No specimens.)

*To all whom it may concern:*

Be it known that I, JOHN A. STRANSKY, a citizen of the United States, residing at Pukwana, in the county of Brule and State of South Dakota, have invented a new and useful Smokeless Powder, of which the following is a specification.

This invention relates to explosives in general, and more particularly to powders, one object of the invention being to provide a compound which will be cheap of manufacture, which will have no corroding effect, and which will have a high degree of penetration.

A further object of the invention is to provide a compound which will not require expensive apparatus in its manufacture, but which may be made without any special tools.

An additional object is to provide a compound which will leave a minimum of residue.

The present powder consists of a combination of potassium chlorate, granulated sugar, alum, sulphur, and alcohol.

In compounding the powder one dram of powdered alum is thoroughly mixed with sixteen ounces of granulated sugar. This mixture is then dissolved in a solution of one ounce of coffee boiled for ten minutes in one pint of soft water, the mixture being heated at the time to assist in its dissolving. After the mixture of sugar and alum is thoroughly dissolved it is removed from the fire and twenty ounces of potassium chlorate is added thereto and is mixed and worked until too stiff to be further worked with a spoon. One-half ounce of alcohol is then added and the whole is mixed thoroughly for five minutes, after which one dram of sulphur is added and mixed in. By this time the compound is dry and is ready for granulation and may be used within twenty minutes.

The chemicals named should of course be of high grade in order to secure the best results, and the alcohol should be 188° proof. The office of the sugar is to furnish the required carbon.

It will be seen from the foregoing that the compound is extremely cheap, while the manufacture of the powder is simple in the extreme, and it has been found that it is smokeless, that it has greater penetration than what has been heretofore produced, and that it does not corrode.

It will of course be understood that the specific proportions mentioned may be varied under different conditions.

What is claimed is—

1. A compound for smokeless powder consisting of potassium chlorate, sugar, powdered alum, sulphur and alcohol.

2. A compound for smokeless powder comprising potassium chlorate, sugar, alum, and sulphur.

3. A compound for smokeless powder consisting of the ingredients and proportions substantially as follows; potassium chlorate twenty ounces; sugar sixteen ounces; alum one dram; sulphur one dram and alcohol.

In testimony that I claim the foregoing as my own I have hereto affixed my signature in the presence of two witnesses.

JOHN A. STRANSKY.

Witnesses:
 THOMPSON WAGAE,
 JOHN TOMSHEK.